(12) United States Patent
Daemke et al.

(10) Patent No.: US 7,401,083 B2
(45) Date of Patent: Jul. 15, 2008

(54) METHODS AND SYSTEMS FOR MANAGING USER ACCESS TO COMPUTER SOFTWARE APPLICATION PROGRAMS

(75) Inventors: Valery Daemke, New York, NY (US); John Horsfield, Morganville, NJ (US); Bonnie Nason, Brooklyn, NY (US); Ilya Simuni, New York, NY (US); Sachindra Sood, Somerset, NJ (US)

(73) Assignee: Goldman Sachs & Co., New York, NY (US)

( * ) Notice: Subject to any disclaimer, the term of this patent is extended or adjusted under 35 U.S.C. 154(b) by 355 days.

(21) Appl. No.: 11/134,973

(22) Filed: May 23, 2005

(65) Prior Publication Data

US 2006/0265760 A1    Nov. 23, 2006

(51) Int. Cl.
*G06F 7/00* (2006.01)
*G06F 17/30* (2006.01)

(52) U.S. Cl. ............................................. 707/9; 707/10
(58) Field of Classification Search ................ 705/1–80; 707/1–200; 709/201–209
See application file for complete search history.

(56) References Cited

U.S. PATENT DOCUMENTS

| | | | | |
|---|---|---|---|---|
| 5,892,900 A | * | 4/1999 | Ginter et al. ................... | 726/26 |
| 5,910,987 A | * | 6/1999 | Ginter et al. ................... | 705/52 |
| 5,982,891 A | * | 11/1999 | Ginter et al. ................... | 705/54 |
| 6,237,786 B1 | * | 5/2001 | Ginter et al. ................. | 213/153 |
| 6,253,193 B1 | * | 6/2001 | Ginter et al. ................... | 705/57 |
| 6,363,488 B1 | * | 3/2002 | Ginter et al. ................... | 726/1 |
| 6,389,402 B1 | * | 5/2002 | Ginter et al. ................... | 705/51 |
| 6,427,140 B1 | * | 7/2002 | Ginter et al. ................... | 705/80 |
| 6,615,253 B1 | * | 9/2003 | Bowman-Amuah ......... | 709/219 |
| 6,640,238 B1 | * | 10/2003 | Bowman-Amuah ......... | 709/201 |
| 7,017,162 B2 | * | 3/2006 | Smith et al. .................. | 719/328 |
| 7,225,249 B1 | * | 5/2007 | Barry et al. .................. | 709/227 |
| 2002/0095571 A1 | * | 7/2002 | Bradee ......................... | 713/164 |
| 2003/0058277 A1 | * | 3/2003 | Bowman-Amuah ......... | 345/765 |
| 2005/0113092 A1 | * | 5/2005 | Coppinger et al. .......... | 455/436 |
| 2005/0216421 A1 | * | 9/2005 | Barry et al. .................... | 705/64 |
| 2006/0040667 A9 | * | 2/2006 | Coppinger et al. .......... | 455/436 |

* cited by examiner

*Primary Examiner*—Mohammad Ali
*Assistant Examiner*—Angelica Ruiz
(74) *Attorney, Agent, or Firm*—Buckley, Maschoff & Talwalkar LLC

(57) ABSTRACT

According to some embodiments, a method of operating a computer system includes installing a plurality of application software programs in the computer system. The method further includes defining user access assignments for each of the application software programs for a respective plurality of users. The method further includes storing, in a user access repository, data which represents all of the user access assignments. The method further includes defining a user access rule, and analyzing the data in the user access repository to determine whether the user access rule is violated by the user access assignments.

35 Claims, 14 Drawing Sheets

| CREATE/EDIT RULE | SEARCH RULES | MODIFY CATEGORIES |

RULE EXECUTION RESULTS FOR RULE 3 (ACCT SVCS & PYMNT APPS) — 1302

Users have access to PAYMENT applications
and are in ACCOUNTING Department

| App Name | User ID | User Name | Status | Location | Dept. |
|---|---|---|---|---|---|
| Pymnt Gds | JB111 | Brown, Jill | A | New York | Accounting |
| Pymnt Svcs | SG222 | Green, Seth | A | Singapore | Accounting |
| Pymnt Svcs | EB333 | Black, Edith | A | New York | Accounting |
| Pymnt Gds | FW444 | White, Frank | U | London | Accounting |
| Pymnt Gds | BL555 | Long, Briana | A | MunichA | ccounting |

1304

[ BACK TO EDITING ]  [ DOWNLOAD ]  [ OVERRIDE ]

FIG. 13

Certification of Payment_Goods Application

Certification Status

| Certification Status | INITIATED | Certification Type | SCHEDULED |
|---|---|---|---|
| Date Initiated | 2005-02-24 12:25:08.0 | Initiated By | Howard, John |
| Date Submitted | | Submitted By | |
| Users Actioned | 168 | Users Not Actioned | 65 |

| Login ID | Name | Dept. | Location | Employee Type | Status | Allow Access | Deny Access | Certifier |
|---|---|---|---|---|---|---|---|---|
| RS999 | Short, Rachel | G475 | Bangalore | FTE | A | ☑ | ☐ | John Howard |
| JC888 | Carter, John | G475 | Bangalore | FTE | A | ☑ | ☐ | John Howard |
| MT777 | Taylor, Mark | G475 | Bangalore | FTE | A | ☑ | ☐ | John Howard |
| JK666 | Klein, Jennifer | G475 | Bangalore | FTE | A | ☑ | ☐ | John Howard |
| FE555 | Evans, Frances | G475 | Bangalore | FTE | A | ☐ | ☐ | |
| WB444 | Bruce, William | G475 | Bangalore | FTE | A | ☐ | ☐ | |
| WH333 | Hasling, Walter | G475 | Bangalore | FTE | A | ☐ | ☐ | |
| KS222 | Schroeder, Kim | G475 | Bangalore | FTE | A | ☐ | ☐ | |

[ Allow All ]  [ Deny All ]  [ Save ]  [ Reset ]

FIG. 14

METHODS AND SYSTEMS FOR MANAGING USER ACCESS TO COMPUTER SOFTWARE APPLICATION PROGRAMS

FIELD

The present invention relates to data processing systems. In some embodiments, the present invention relates to methods and apparatus for securing access to aspects of data processing systems.

BACKGROUND

It is common for large organizations to operate numerous computers linked together by one or more data communication networks. A large part of the operation of the computers may be controlled by application computer software programs that allow the computers to perform desired functions. In some organizations, the total number of application programs may be in the hundreds.

In many cases, each application program is accessible by a considerable number of users. Conventional computer system security practices call for access to each application program to be limited to a specific list of users. It is also frequently the case that among authorized users of an application program, various levels of access may be defined. Typically, a data structure known as an "access control list" is associated with each application program that runs on a computer of the computer system. The access control list stores data that identifies authorized users of the application program, and if appropriate also indicates the level of access assigned to each authorized user.

Although the access control list mechanism allows for assignment of user access on an application-by-application basis, it is not conducive to global management and oversight of access assignments for application programs. Among other shortcomings of access control lists, such lists do not per se allow system administrators to assure that undesirable combinations of assignments are not made.

SUMMARY

To address the foregoing, embodiments of the present invention concern a method, an apparatus, and a medium storing processor-executable process steps to install a plurality of application software programs in a computer system; define user access assignments for each of the application software programs for a respective plurality of users; store, in a user access repository, data which represents all of the user access assignments; define a user access rule; and analyze the data in the user access repository to determine whether the user access rule is violated by the user access assignments.

In some aspects, the user access rule may forbid any of the users to have access both to a first one of the applications and to a second one of the application. In some aspects, the user access rule may forbid any of the users who is a member of a certain department to have access to a certain one of the applications. In some aspects, the user access rule may forbid any of the users who is located in a certain office to have access to a certain one of the applications.

In other aspects, embodiments of the present invention concern a method, an apparatus, and a medium storing processor-executable process steps to install a plurality of application software programs in a computer system; define user access assignments for each of the application software programs for a respective plurality of users; store, in a user access repository, data which represents all of the user access assignments; and archive the data stored in the user access repository on each of a plurality of occasions.

In some aspects, a user access rule may be defined and the data in the user access repository analyzed to determine whether the user access rule is violated by the user access assignments, and the rule and the results of the analysis may be archived.

As used herein and in the appended claims, to "archive" refers to storing data on a recording medium permanently—i.e., for a period of months or years—rather than merely backing up data for a relatively short period of time until a subsequent back-up operation occurs.

In other aspects, embodiments of the present invention concern a method, an apparatus, and a medium storing processor-executable process steps to install a plurality of application software programs in a computer system; define user access assignments for each of the application software programs for a respective plurality of users; store, in a user access repository, data which represents all of the user access assignments; display in a screen display some of the data (the screen display including a display element to indicate that one of the user access assignments is to be revoked); detecting actuation of the display element; and respond to the detected actuation of the display element by sending an electronic mail message to a system administrator to indicate that the one of the user access assignments is to be revoked.

As used herein and in the appended claims, "system administrator" refers to any user who is authorized to change authorization of users to access of one or more aspects of an application software program.

With these and other aspects of the invention, centralized management of user access assignments may be conveniently implemented and system-wide policies in regard to user access assignments may be efficiently enforced.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIGS. 12 and 13 are screen displays generated in the system of FIG. 1 in connection with the process illustrated by FIG. 9.

FIG. 14 is a screen display generated in the system of FIG. 1 in connection with the process illustrated by FIG. 11.

DETAILED DESCRIPTION

Figure 1:
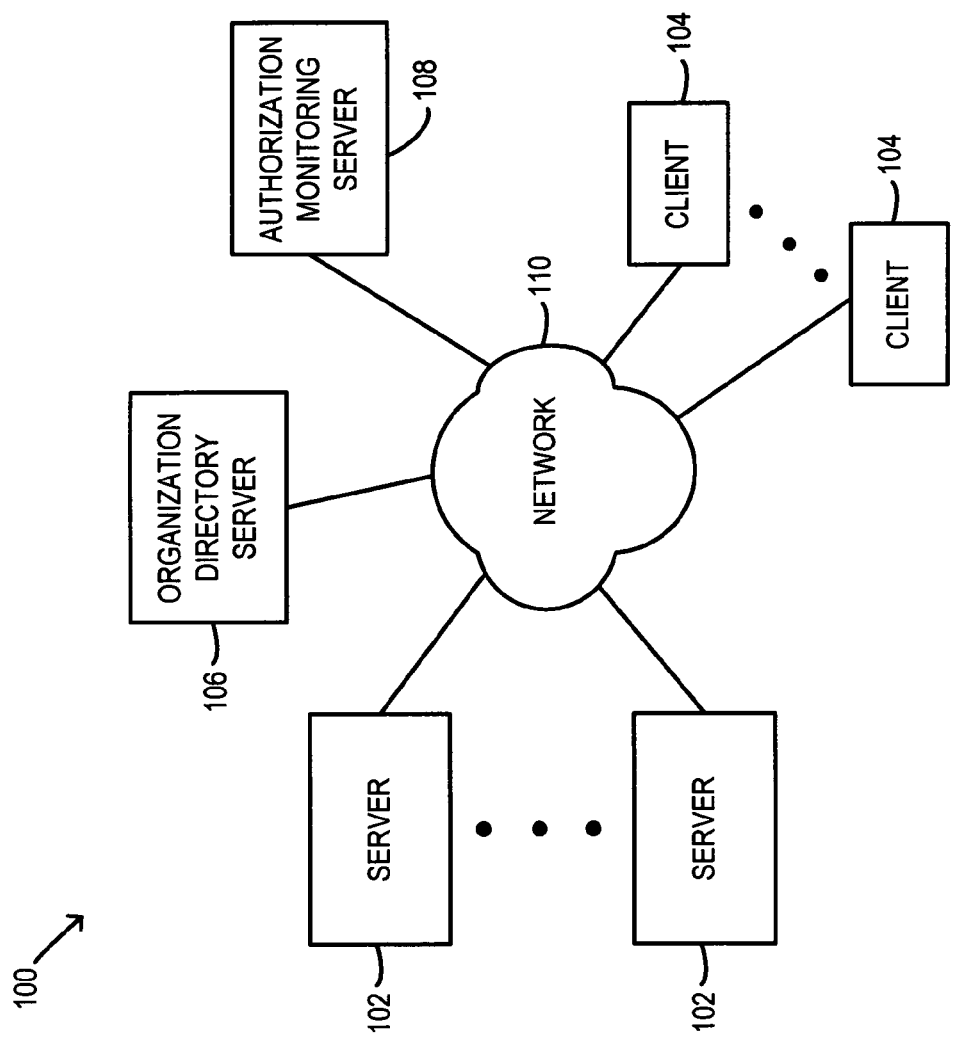
FIG. 1 is a block diagram of a system consistent with the present invention.

In general, and for the purposes of introducing concepts of embodiments of the present invention, a user access repository is maintained in an authorization monitoring server that is part of a computer system of a large organization. The user access repository stores data that reflects the user access assignments implemented by the various access control lists maintained in servers that are part of the computer system. The user access repository facilitates management and oversight of user access assignments across the computer system, and across numerous application programs that run in the system. The user access repository also facilitates enforcement of system-wide policies in regard to user access to the system's application programs. Among other functions, the authorization monitoring server allows administrative personnel to define rules that forbid certain combinations of user access assignments and/or forbid certain types of user access assignments to certain categories of users. The rules may be applied to data stored in the user access repository to detect violations of the rules and to aid in enforcement of various administrative and/or regulatory policies.

The authorization monitoring server may also include capabilities for archiving data stored in the user access repository and/or for archiving assignment rules and results obtained by applying the assignment rules to the user access repository data. These archiving activities may provide an audit trail to provide confirmation that user access policies, possibly including regulatory requirements, are and have been met by the computer system.

The authorization monitoring server may also include capabilities to aid administrative personnel in certifying that user access assignment policies are properly applied on an application-by-application basis.

Features of some embodiments of the present invention will now be described by first referring to FIG. 1, where a block diagram of one embodiment of a computer system 100 is shown. As shown, computer system 100 includes a number of different components which cooperatively operate to perform data processing requirements and other operational functions of a large organization, such as a multinational financial services company or an industrial corporation.

As depicted, computer system 100 includes a number (potentially a considerable number) of server computers 102. One or more of the server computers 102 may run one or more application programs (not separately indicated in FIG. 1) to perform data processing and other functions required by the organization which operates the computer system 100. Access by users to the application programs may be assigned via access control lists, each of which is associated with a respective one of the application programs. In at least some cases, the access control lists may assign particular levels of access to various ones of the users assigned access to the application programs associated with the access control lists.

The total number of application programs that run on the servers 102, considered collectively, may number in the hundreds, or even more, in the case of a large, complex organization. The server computers 102 may be geographically dispersed, and may, for example, be spread across two or more continents. Except for operations described below related to maintenance and updating of a user access repository, the server computers 102 and the application programs and other software operating thereon may be provided and may operate in accordance with conventional practices.

The computer system 100 includes a considerable number of client computers 104, which may for example be conventional personal computers and/or notebook computers. Each client computer may typically be operated by a single individual user of the computer system 100.

The computer system 100 also includes an organization directory server 106, which may maintain all or part of a comprehensive database (not separately indicated) of all employees of the organization which operates the computer system 100. (As used in the previous sentence, the term "employees" includes individuals retained temporarily or on a long-term basis via contract, as well as consultants and/or employees of third party organizations, all of whom may provide services to the organization which operates the computer system 100 and/or who may need access to one or more of the application programs which run on the computer system 100.) The database may, for example, store, for each employee, information such as the employee's name, office location, department, and one or more log-in identifiers or designations used by the employees to access the computer system 100 and/or one or more of the application programs that run on the computer system 100. The organization directory server 106 may, for example, perform one or more other human-resource-related functions of the organization that operates the computer system 100.

In addition, and in accordance with principles of the present invention, the computer system 100 includes an authorization monitoring server 108. The authorization monitoring server 108 may operate in a manner described below to aid administrative personnel in managing, supervising and policing user access assignments across the computer system 100.

As used herein, devices (e.g., servers 102, client computers 104, organization directory server 106, and authorization monitoring server 108) may communicate, for example, via one or more communication networks, which are collectively indicated at 110 in the drawing. For example, some or all of the devices may be in communication via an Internet Protocol (IP) network such as the Internet. Some or all of the devices may be in communication via other types of networks such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, communication between some or all of the devices of computer system 100 may be via temporary computer communication channel (e.g., a logic path through which information can be exchanged). In other words, the communication channel between various devices may be established and discontinued as appropriate. For example, a client computer 104 may exchange information with one of the servers 102 only when communication is necessary for a user of the client computer 104 to access an application that runs on the server in question.

According to some embodiments, some or all of the devices may communicate with other devices via a public computer communication network. That is, at least a portion of the communication network 110 may be accessed by devices other than the devices depicted in FIG. 1. Note, however, that the information exchanged between the devices shown in FIG. 1 may be encrypted or otherwise protected to prevent a third party from accessing, manipulating, understanding and/or misusing the information. In some embodiments, some or all of the devices may communicate over a private network.

In other embodiments, the devices of FIG. 1 are connected differently than as shown. For example, some or all of the devices may be connected directly to one another (e.g., via dedicated data communication channels). Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data.

Figure 2:
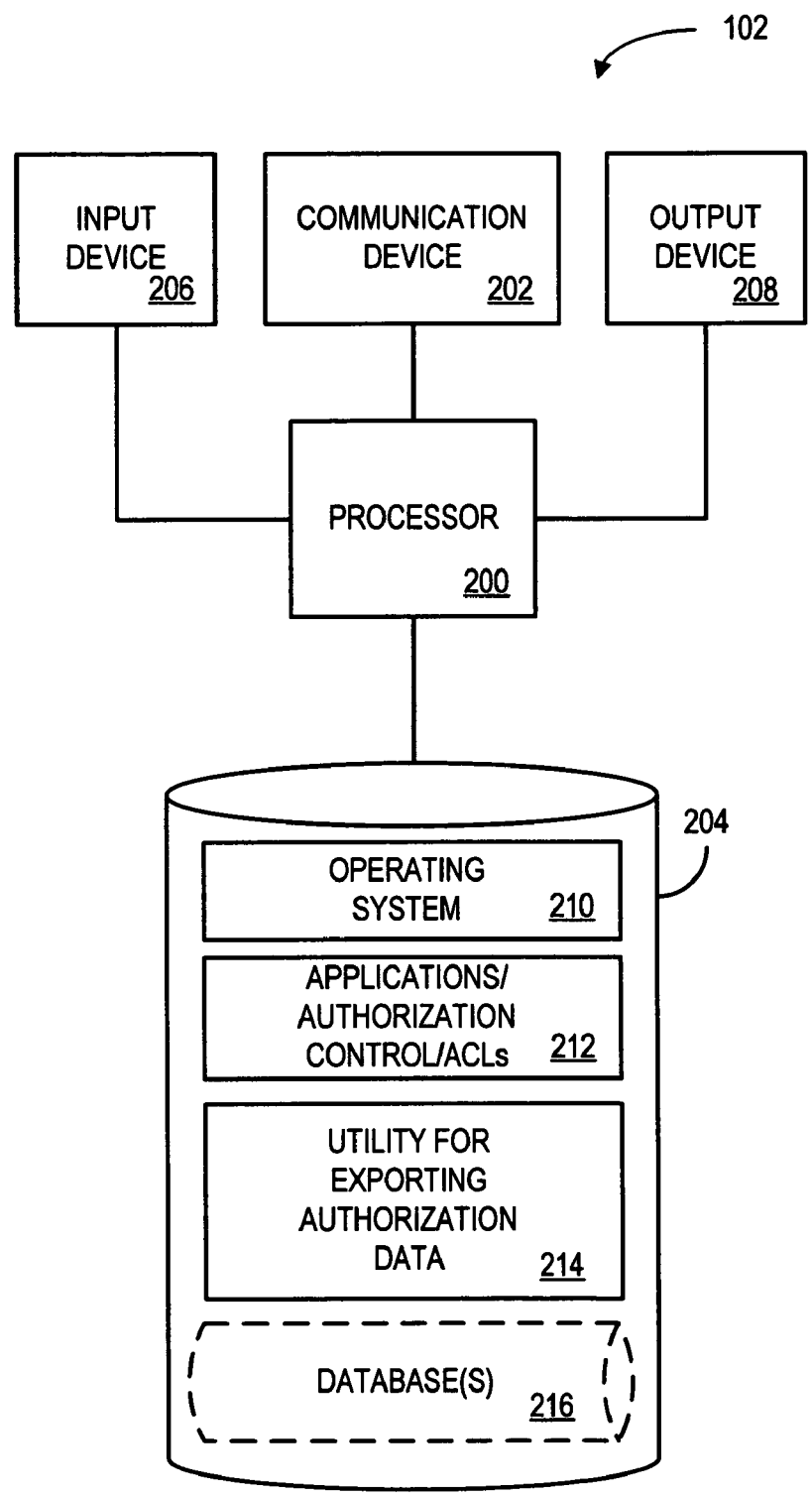
FIG. 2 is a block diagram of one embodiment of a typical one of a number of servers included in the system of FIG. 1.

Reference is now made to FIG. 2, where an embodiment of a typical one of the servers 102 is shown. As depicted, server 102 includes a computer processor 200 operatively coupled to a communication device 202 and a storage device 204. The server 102 may also include one or more input devices 206 coupled to the processor 200 and one or more output devices 208 coupled to the processor 200.

Processor 200 may be constituted by one or more conventional processors, and may, for example, comprise RISC-based and other types of processors. Processor 200 operates to execute processor-executable process steps so as to control the elements of server 102 to provide desired functionality.

Communication device 202 may be used to facilitate communication with, for example, other devices (such as client computers 104). Communication device 202 is therefore preferably configured with hardware suitable to physically interface with desired external devices and/or network connections. For example, communication device 202 may comprise an Ethernet connection to a local area network through which server 102 may receive and transmit information over the World Wide Web.

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices.

Storage device 204 stores one or more programs for controlling processor 200. Among the functions implemented via the programs may be host server functions. The programs may include an operating system 210 and one or more application programs 212. Block 212 also represents authorization control facilities and access control lists associated with the application programs 212. The access control lists may list users (e.g., by log-in ID) who are authorized to access respective application programs. In at least some cases, the access control lists may define for each user the level of access assigned to each user. For example, in the case of an application for implementing payment of accounts payable, certain employees in the accounts payable department may have full access to the application for all purposes, including issuance of checks. For other employees, such as members of the internal audit staff, their level of access to the application may be limited access such as read-only access.

The authorization control facility for each application may receive each request by a user for access to the application, and may grant the request if and only if the access control list indicates that the requesting user is entitled to the requested access.

The programs stored in the storage device 204 also include, in accordance with an aspect of the present invention, a utility 214 by which the server 102 exports to the authorization monitoring server 108 (FIG. 1) data that represents the user access assignments represented by the contents of the access control lists for the applications 212.

In addition, the storage device 204 may store one or more databases 216 that store data processed or otherwise used by the application programs 212.

Any or all process steps of server 102 may be read from a computer-readable medium, such as a floppy disk, a CD-ROM, a DVD-ROM, a Zip™ disk, a magnetic tape, or a signal encoding the process steps, and then stored in storage device 204 in a compressed, uncompiled and/or encrypted format. Processor-executable process steps being executed by processor 200 may typically be stored temporarily in RAM (not separately shown) and executed therefrom by processor 200. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

There may also be stored in storage device 204 other unshown elements that may be necessary for operation of server 102, a database management system, other applications, other data files, and "device drivers" for allowing processor 200 to interface with devices in communication with communication device 202. These elements are known to those skilled in the art, and are therefore not described in detail herein.

Figure 3:
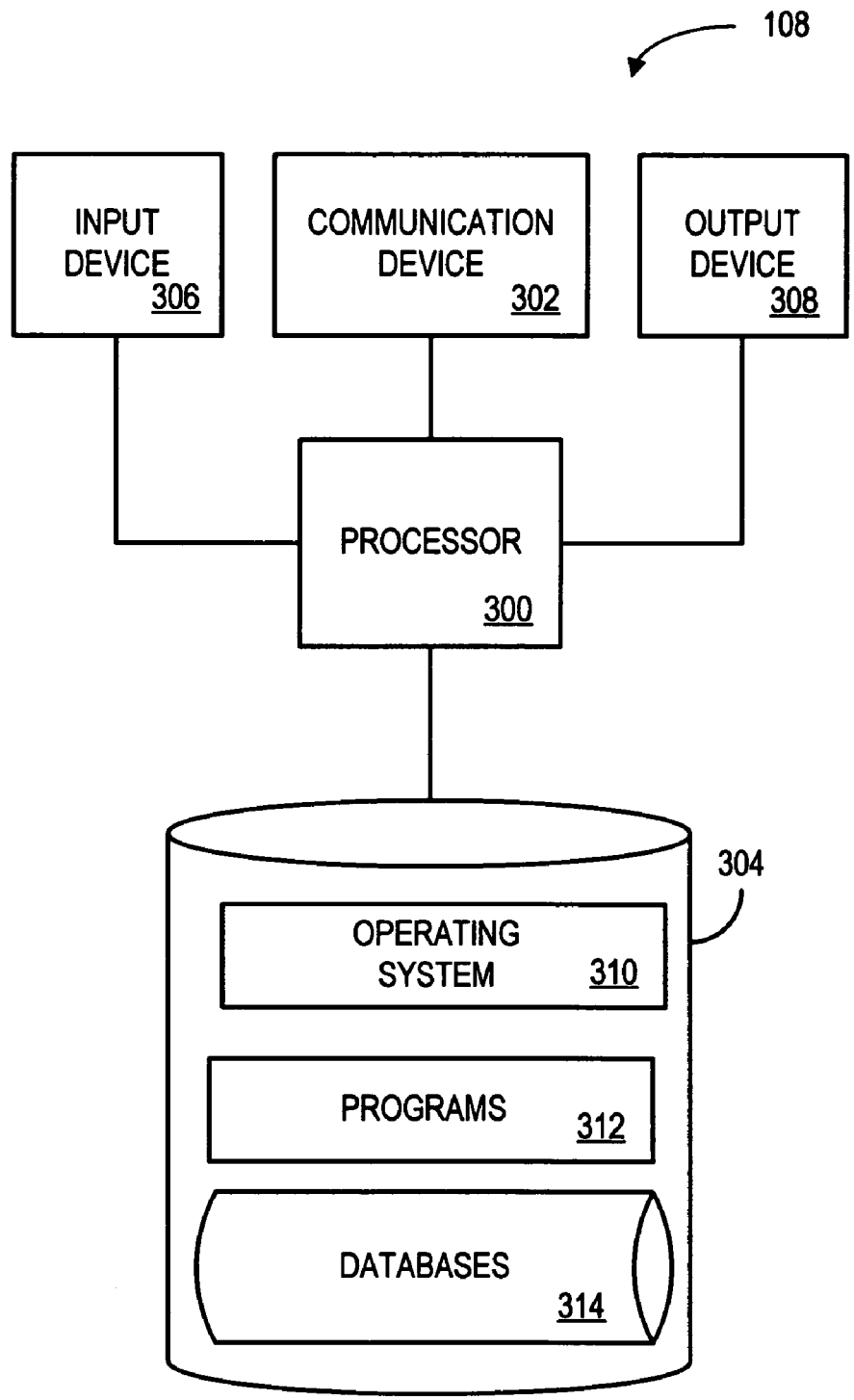
FIG. 3 is a block diagram of one embodiment of an authorization monitoring server included in the system of FIG. 1.

Reference is now made to FIG. 3, where an embodiment of the authorization monitoring server 108 is shown. As depicted, authorization monitoring server 108 includes a computer processor 300 operatively coupled to a communication device 302 and a storage device 304. The server 108 may also include one or more input devices 306 coupled to the processor 300 and one or more output devices 308 coupled to the processor 300.

Processor 300 may be constituted by one or more conventional processors, and may, for example, comprise RISC-based and other types of processors. Processor 300 operates to execute processor-executable process steps so as to control the elements of authorization monitoring server 108 to provide desired functionality in accordance with aspects of the present invention, including functionality that is described in more detail below.

Communication device 302 may be used to facilitate communication with, for example, other devices (such as client computers 104, server computers 102, organization directory server 106). Communication device 302 is therefore preferably configured with hardware suitable to physically interface with desired external devices and/or network connections. For example, communication device 302 may comprise an Ethernet connection to a local area network through which authorization monitoring server 108 may receive and transmit information over the World Wide Web.

Storage device 304 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices.

Storage device 304 stores one or more programs for controlling processor 300. Among the functions implemented via the programs may be host server functions. The programs may include an operating system 310 and one or more other programs 312.

The programs 312 comprise processor-executable process steps of authorization monitoring server 108, and may include process steps that constitute processes provided in accordance with principles of the present invention to implement system-wide authorization monitoring, supervision and control. Processor 300 performs instructions of programs 312, and thereby may operate in accordance with the present invention. In some embodiments, programs 312 may be configured, at least in part, as a neural network or other type of program using techniques known to those skilled in the art to achieve the functionality described herein.

In addition, the storage device 304 stores one or more databases 314 that store data processed or otherwise used by the programs 312. Further details of at least some of the databases 314 will be provided below.

Any or all process steps of authorization monitoring server 108 may be read from a computer-readable medium, such as a floppy disk, a CD-ROM, a DVD-ROM, a Zip™ disk, a magnetic tape, or a signal encoding the process steps, and then stored in storage device 204 in a compressed, uncompiled and/or encrypted format. Processor-executable process steps being executed by processor 300 may typically be stored temporarily in RAM (not separately shown) and executed therefrom by processor 300. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

There may also be stored in storage device 304 other unshown elements that may be necessary for operation of authorization monitoring server 108, a database management system, other applications, other data files, and "device drivers" for allowing processor 300 to interface with devices in communication with communication device 302. These elements are known to those skilled in the art, and are therefore not described in detail herein.

The authorization monitoring server 108 may also perform functions other than and/or in addition to those described above, and may perform functions unrelated to authorization monitoring.

Figure 4:
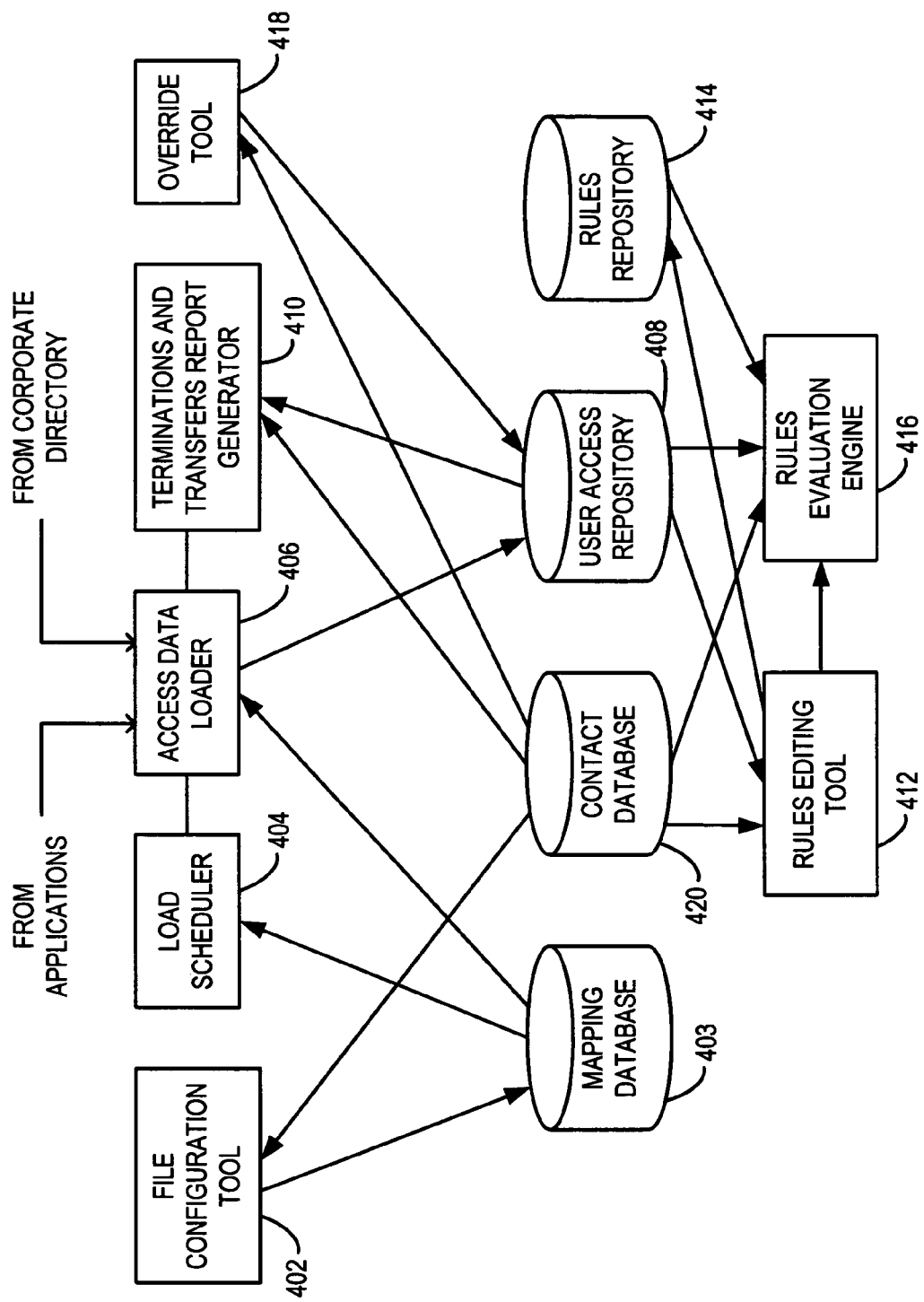
FIG. 4 is a functional block diagram that illustrates operations performed by the authorization monitoring server of FIG. 3.

FIG. 4 is a functional block diagram that illustrates operations performed by the authorization monitoring server 108.

Applications that run in the servers 102 and that are managed by the authorization monitoring server 108 (which may manage authorizations for some or all of the applications on servers in the system 100) provide an extract of their users and/or user access privileges to the authorization monitoring server 108. The programs that run on the authorization monitoring server 108 include a file configuration tool 402. The file configuration tool 402 may be GUI (graphical user interface)-based and may allow the system operator to describe the structure of the user access privileges of the application program which is providing its user/user privilege information. The file configuration tool 402 may also format the user/access files provided by the application program in a form suitable for storage by the authorization monitoring server 108. A set-up process performed by the file configuration tool 402 may indicate characteristics of the user/access files from the application program. These characteristics may include whether fields in the files are fixed length, delimited, etc. GUI aspects of the file configuration tool 402 may allow the system operator to visually map data elements of the application program user/access files to data storage fields employed for application access data in the authorization monitoring server 108. Mapping of the application program user/access file structure to the storage structure for the authorization monitoring server 108 may be represented by data stored in a mapping database 403 that is maintained in the authorization monitoring server 108. Because of the potentially diverse nature of the applications that run in the system, there may be a wide variety of different types of levels of access that are assignable in the individual applications. Thus the mapping of user/access files to the user access repository (discussed below) may be quite complex.

Set-up of the user/access files of an application program using the file configuration tool 402 may be a one-time process, except that further set-up may be required if there are changes in the user/access file structure of the application program. After set-up, the application may deliver an automated feed of its user/access files (i.e., the contents of its access control lists) to the authorization monitoring server 108 at regular intervals. The length of the intervals may depend on how frequently users and/or access assignments change for the application program in question.

The programs that run on the authorization monitoring server 108 also include a load scheduler 404. The load scheduler 404 may be a process that continually checks for arrival of a user/access file sent to the authorization monitoring server 108 from any of the application programs that run on the servers 102. When such a file arrives, the load scheduler checks the mapping database 403 to determine whether the file configuration tool has provided a mapping for the file. If so, the load scheduler 404 invokes an access data loader 406. The access data loader 406 parses the user/access file from the application program according to the format stored in the mapping database 403, and loads the data from the file in an appropriate format into a user access repository 408. The access data loader 406 also uses user log-in IDs included in the application program user/access file to access the organization directory server 106 (FIG. 1) as necessary (i.e., if the user is not already listed in the user access repository 408, or if the data for the user in the user access repository is not up to date) to obtain names, locations and department affiliations of the users assigned access to the application program. This information too is loaded into the user access repository 408 by the access data loader 406. (In addition, the authorization monitoring server 108 may maintain, in a separate database which is not shown, a record of all changes to the data stored in the user access repository 408.)

In the event that a user reported in the user/access file from the application program cannot be definitively identified from the organization directory server 106, the access data loader may store corresponding data in the user access repository 408 to allow for exception reporting so that the discrepancy can be corrected later by operator action. If the user privileges indicated by the incoming user/access file from the application program are different from the data previously stored in the user access repository 408, the user access repository 408 is updated accordingly. As before, records of such updating may be stored in a separate database, which is not shown.

When an employee's employment by the organization is terminated, or when an employee is transferred from one department to another, notification of such a termination or transfer is provided from the organization directory server 106 (FIG. 1) to the access data loader 406 (FIG. 4). The access data loader 406 makes note of such information and supplies the information to a terminations and transfers report generator 410. The terminations and transfers report generator 410, in turn, may generate suitable reports of the terminations and/or transfers and/or may provide suitable notifications to "owners" of applications to which such employees had been assigned access, so that the application "owners" may take whatever steps may be appropriate to terminate or modify the employee's access to the applications. In addition, the access data loader 406 may cause suitable updated information for the employees to be stored in the user access repository 408.

The programs that run on the authorization monitoring server 108 also include a rules editing tool 412. As will be seen from subsequent discussion, the rules editing tool 412 provides a facility for individuals with suitable privileges with respect to the authorization monitoring server 108 to define rules that are to be applied by the authorization monitoring server 108 to user access assignments in effect in the computer system 100. Once generated by the rules editing tool 412, a user access rule may be stored in a rules repository 414 for future use. Alternatively, a user access rule may be applied to the data in the user access repository 408 immediately after the rule is defined.

The programs that run on the authorization monitoring server 108 also include a rules evaluation engine 416. The rules evaluation engine 416 is operable to analyze user access data stored in the user access repository 408 to determine whether user access assignments in effect in the system 100 violate a rule that is currently generated by the rules editing tool 412 or whether a rule retrieved from the rules repository 414 is violated by the user access assignments currently in effect. If a rule violation or violations are found by the rules evaluation engine 416, the rules evaluation engine 416 identifies the violation or violations and reports the violation or violations to appropriate personnel for further review and action.

The programs that run on the authorization monitoring server 108 also include an override tool 418. The override tool 418 may permit the "owner" of an application program or other suitably authorized individual to allow a user's assignment to access the application program to continue, notwithstanding that the assignment violates a rule or policy or even though the user has experienced a disqualifying transfer from one department to another. A record of the determination to implement an override may be stored in the user access repository 408 by the override tool 418. In some embodiments, implementation of an override may require that a specific reason for the override be entered and stored. In some embodiments, overrides are effective only for a limited period of time, and will cease to be effective unless renewed prior to the end of the limited time period.

The authorization monitoring server 108 also maintains a contact database 420. The contact database 420 may effectively function as an access control list for the authorization monitoring server 108, by listing users entitled to access one or more of the functions of the authorization monitoring server 108 such as the file configuration tool 402, the override tool 418, the rules editing tool 412 and the rules evaluation engine 416.

Although not indicated in FIG. 4, the programs that run on the authorization monitoring server 108 may also include an inquiry tool. The inquiry tool may allow suitably authorized individuals to view on-line reports or the like (or to download reports) concerning data stored in the authorization monitoring server 108. For example, the inquiry tool may allow such individuals to obtain information about user access assignments for the various application programs that run in the computer system. As another example, the inquiry tool may provide access to information that is stored in the organization directory server 106. The inquiry tool may provide various views of the data present in the user access repository or otherwise relevant to user access assignments. In addition, the inquiry tool may provide a facility for ad hoc queries.

Figure 5:
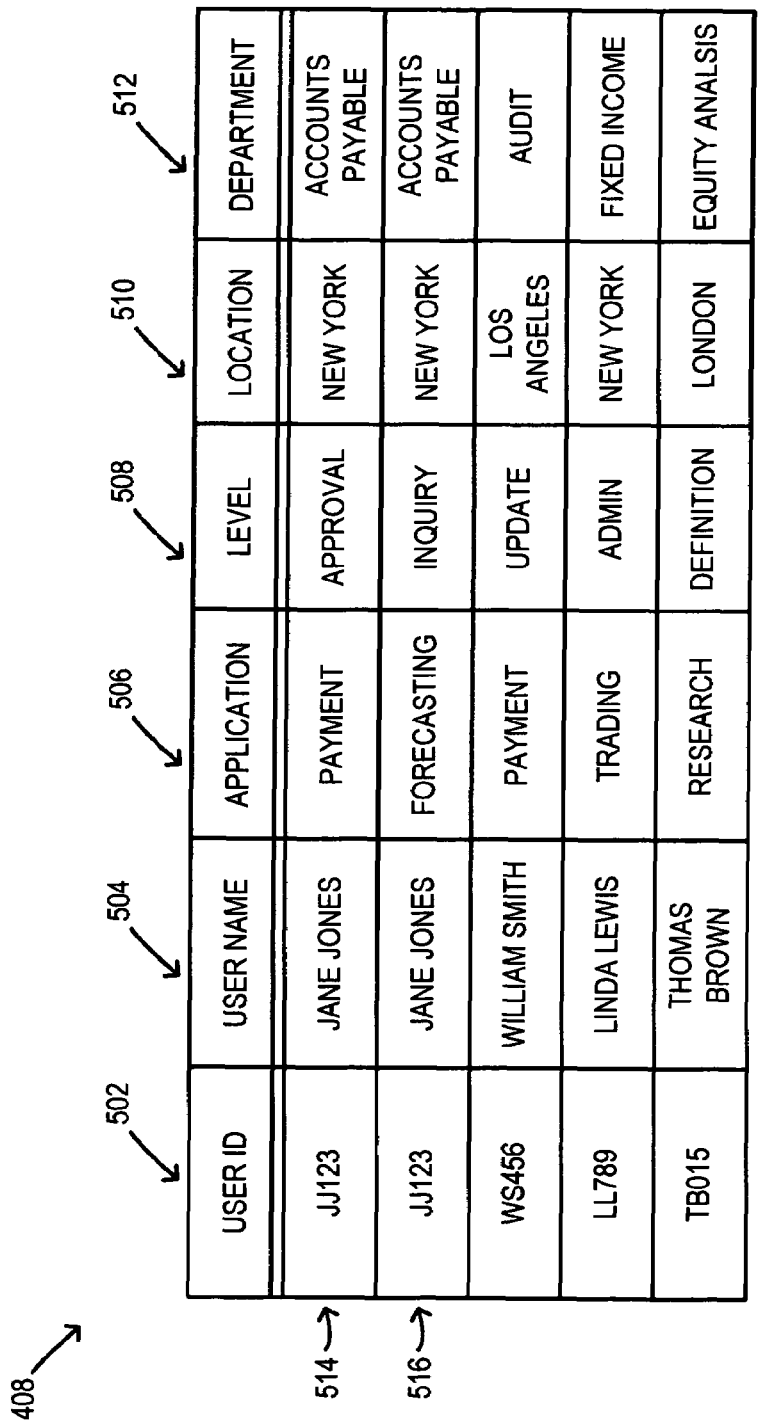
FIG. 5 illustrates in tabular form an example of a user access repository maintained in the authorization monitoring server of FIG. 3.

FIG. 5 illustrates in tabular form an example of the user access repository 408. The rows of the table each represent a respective entry in the user access repository. The columns of the table each represent a respective data field for each of the entries. In particular, column 502 represents a user identifier data field; column 504 represents a user name data field; column 506 represents a data field which identifies an application program that runs in the computer system; column 508 represents a data field which indicates the level of access assigned to the user identified in the data fields 502, 504 with respect to the application program identified in data field 506; column 510 represents the office location of the user identified in data fields 502, 504; and column 512 represents the departmental affiliation of the user identified in data fields 502, 504. As illustrated by entries 514, 516, there may be more than one entry in the user access repository for any given user, with each of such multiple entries corresponding to a respective application program to which the employee in question has been assigned access.

It should be understood that the illustration in FIG. 5 of the user access repository is exemplary only, and that in practice the user access repository may include many more entries than the number of entries shown in FIG. 5. Also, the number and/or types of data fields may be different from those illustrated in FIG. 5.

Figure 6:
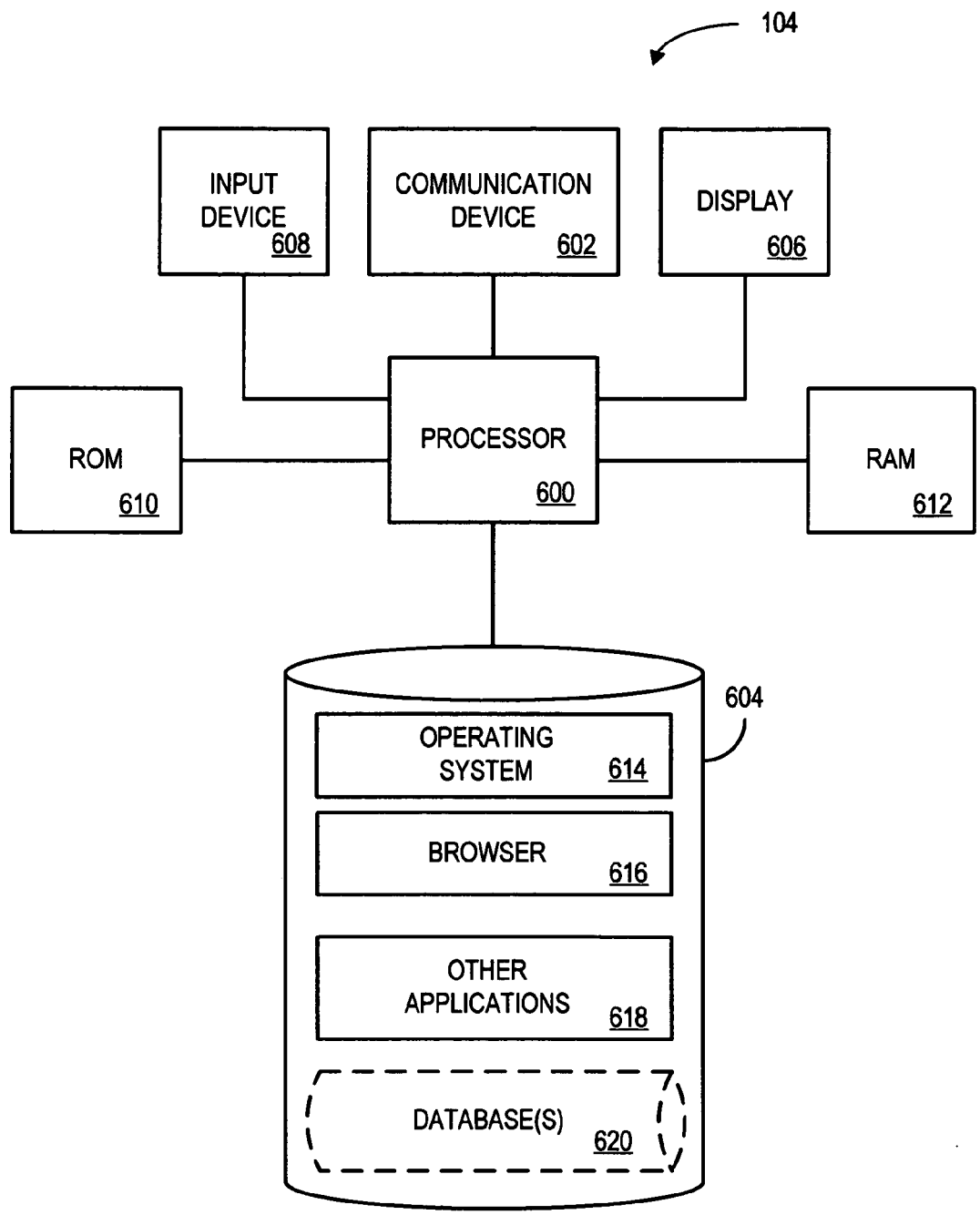
FIG. 6 is a block diagram of one embodiment of a typical one of a number of client computers that are included in the system of FIG. 1.

Reference is now made to FIG. 6, where an embodiment of a typical one of the client computers 104 is shown. As depicted, client computer 104 includes a processor 600 operatively coupled to a communication device 602, a storage device 604, a display 606, one or more input devices 608, ROM 610 and RAM 612. Some or all of the hardware constituting the client computer 104 may be conventional personal computer (PC) hardware. Thus the processor 600 may be a conventional Pentium® processor, for example, and the communication device 602 may be a conventional communication port which enables the user device 104 to exchange data with the authorization monitoring server 108 and/or the servers 102 via, e.g., an Ethernet connection. The storage device 604 may include a conventional hard disk drive or other mass storage device. The display 606 may be a conventional CRT or flat panel computer monitor. The display 606 has a screen (not separately shown) by which a user interface in accordance with principles of the present invention may be presented to a user of the client computer 104.

The input devices 608 may include a conventional keyboard and/or a conventional pointing device such as a mouse or trackball. ROM 610 may store basic input/output instructions and instructions used during boot-up of client computer 104. RAM 612 provides fast data storage and retrieval and thus may function as working memory for processor 600. In addition, RAM 612 may temporarily store instructions corresponding to processor-executable process steps being executed by processor 600.

Storage device 604 stores one or more programs for controlling processor 600. The programs include an operating system 614, a browser 616 and possibly other applications 618. The programs comprise processor-executable process steps of user device 104. In particular, under the control of the browser 616, the client computer 104 may interact with the authorization monitoring server 108 in accordance with principles of the invention in a manner to be described below. Processor 600 performs instructions of browser 616, and thereby may operate in accordance with the present invention. The programs may also include, for example, device drivers. Storage device 604 may also store one or more databases 620.

Figure 7:
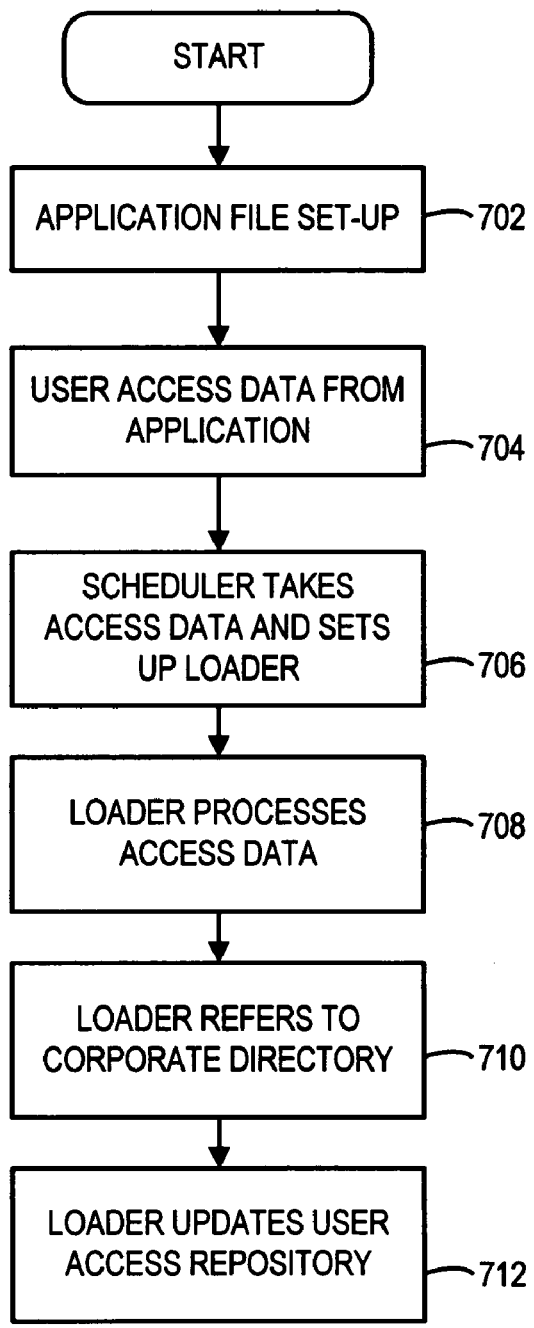
FIG. 7 is a flow diagram that illustrates an exemplary process for updating the user access repository of FIG. 5.

FIG. 7 is a flow diagram that illustrates an exemplary process for updating the user access repository 408.

At 702 in FIG. 7, a set up procedure is followed in which a system operator defines a mapping between the structure of user access assignment files in one of the applications which runs on the system and the structure of the user access repository 408. This mapping may be defined by use of the file configuration tool 402. The results of the mapping are stored in the mapping database 403.

At 704 in FIG. 7, the load scheduler 404 detects that the application is sending user access assignment data for the application to the authorization monitoring server 108. At 706, the load scheduler 404 takes the incoming user access assignment data and invokes the access data loader 406. At 708, the access data loader 406 parses the incoming user access assignment data in accordance with the mapping for the application that was generated at 702 and stored in the mapping database 403. At 710, the access data loader 406 compares user information in the incoming user access assignment data with user information available from the organization directory server 106 and with the relevant user information, if any, already stored in the user access repository 408. At 712 the access data loader 406 updates the user access repository with any new or different user information or user access assignment data received from the application or from the organization directory server 106.

The activities indicated at 704 through 712 may be repeated each time the application sends user access assignment data to the authorization monitoring server 108. This may occur at regular intervals. For example, for an application with frequent changes/additions to user access assignments, the application may send user access assignment data to the authorization monitoring server 108 once every day. For other applications, the feed of user access assignment data to the authorization monitoring server 108 may occur less often, say weekly or monthly.

The application file set-up procedure (702) may only be performed once for a given application, or may only be repeated on the rare occasions when the user access assignment information structure for the application is changed. Except for the set-up procedure, all of the activities indicated in FIG. 7 may occur automatically, without operator or user involvement.

The process of FIG. 7 may be performed once or a considerable number of times, in whole or in part, for each application program that runs in the computer system 100, or with respect to at least some of such application programs.

Figure 8:
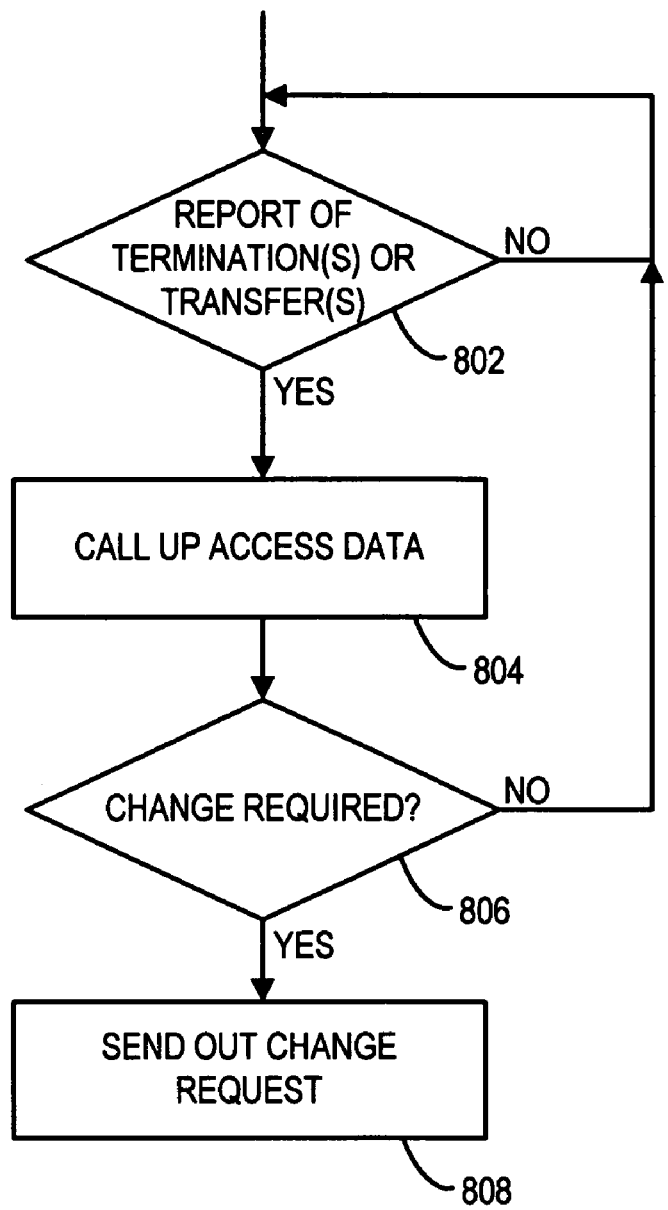
FIG. 8 is a flow diagram that illustrates an exemplary process for handling a termination of employment or transfer of an employee of the organization that operates the system of FIG. 1.

FIG. 8 is a flow diagram that illustrates an exemplary process for handling a termination of employment or transfer of an employee of the organization that operates the computer system 100.

At 802, it is determined whether the access data loader 406 receives, from the organization directory server 106, information that indicates termination of employment or transfer from one department to another of an employee of the organization that operates the computer system 100. Such information may be provided by the organization directory server 106 to the authorization monitoring server 108 in real time or alternatively on a batch basis. If information regarding a termination of employment or transfer is received, the terminations and transfer report generator 410 is invoked by the access data loader 406. The terminations and transfer report generator 410 then calls up (block 804 in FIG. 8), from the user access repository 408, the user access assignment information for the employee in question. The data called up at 804 may relate to a number of different applications to which the terminated/transferred employee had been granted access.

It is then determined (decision block 806 in FIG. 8), from this information, whether changes in the user access assignments for the employee are in order. If so, then the terminations and transfer report generator 410 may send out a notice or request (block 808) to the "owner(s)" of the application or applications in question that the "owner(s)" should implement changes/revocations to the user access assignments for the terminated/transferred employee. The application "owner" may then implement user access assignment changes/revocations in accordance with the notice from the terminations and transfer report generator 410, or alternatively may implement an override to continue the user access assignment unchanged, notwithstanding the termination or transfer of the employee.

In addition, the access data loader 406 may update the user data in the user access repository 408 to indicate the termination or transfer in question.

Figure 9:
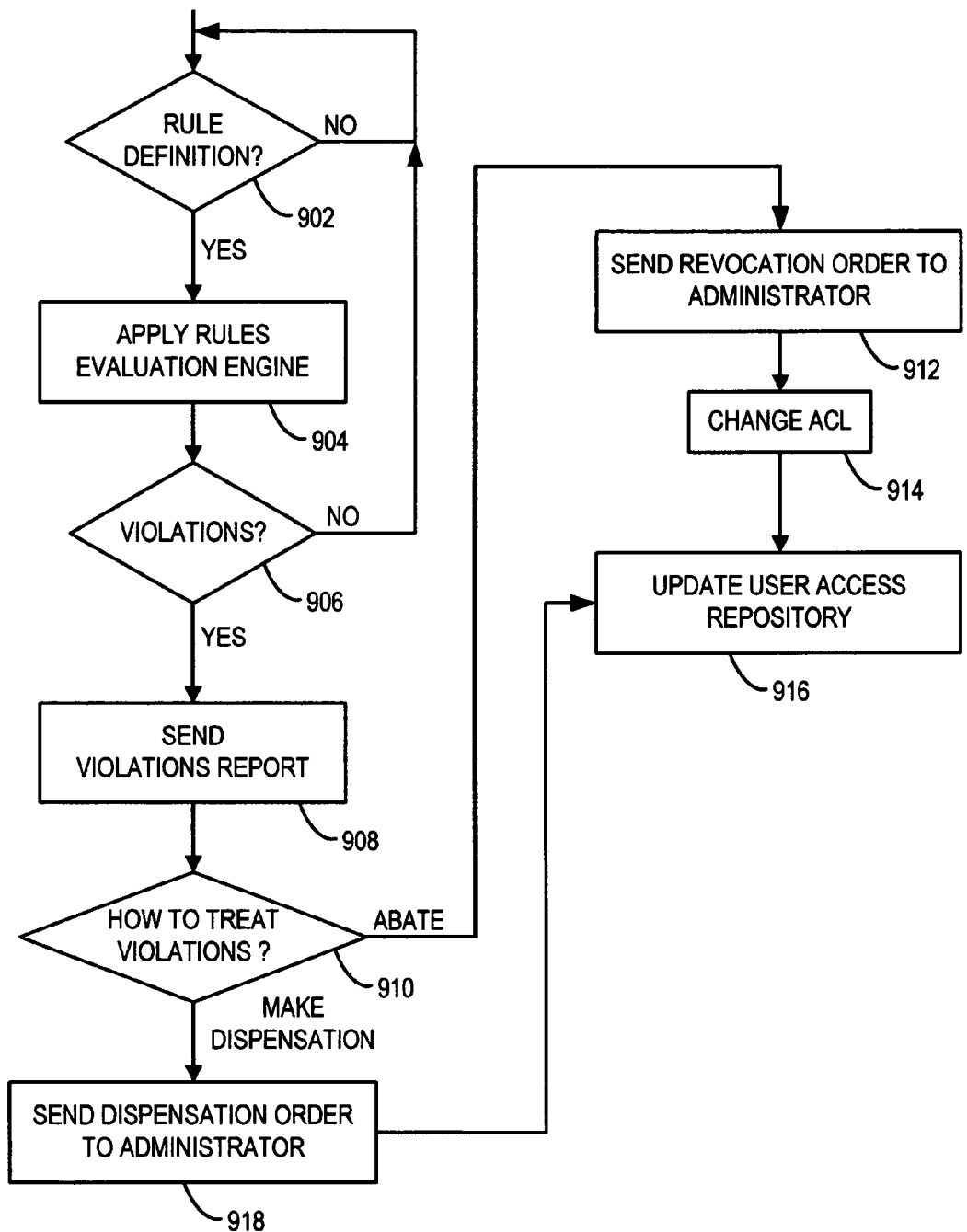
FIG. 9 is a flow diagram that illustrates an exemplary process for detecting violations of policies in regard to assignments of access to application programs that run in the system of FIG. 1.

FIG. 9 is a flow diagram that illustrates an exemplary process for detecting violations of policies in regard to assignments of access to application programs that run in the computer system 100.

Figure 12:
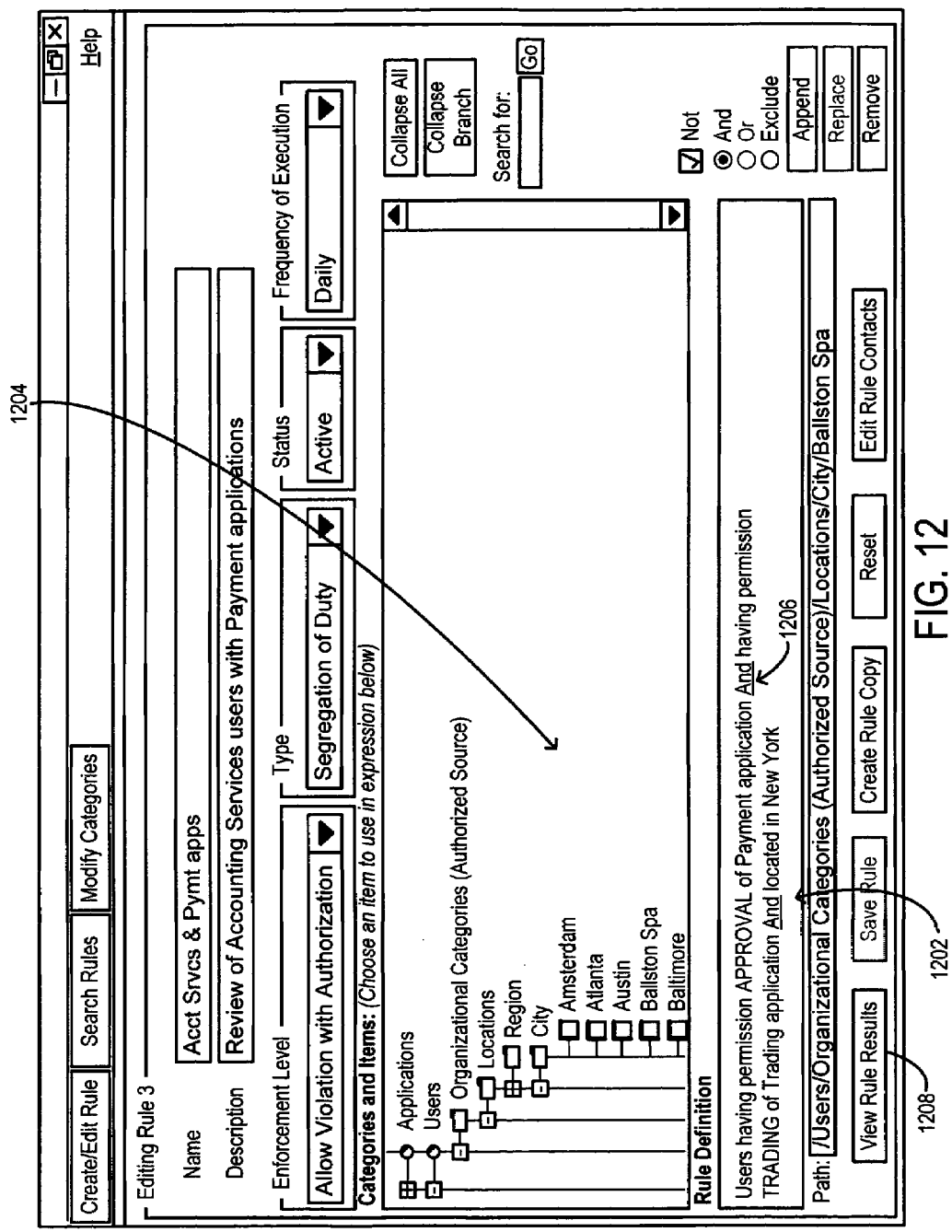

At 902, it is determined whether an operator who is authorized to use the authorization monitoring server has defined a rule regarding user access assignments that are maintained in the computer system 100. FIG. 12 is an example screen display ("screen shot") that may be presented to an authorized operator to allow the operator to define a rule regarding user access assignments. The screen display of FIG. 12 may be presented to the user via the display device 606 (FIG. 6) of a client computer 104 (FIGS. 1 and 6) operated by the operator. The screen display may be presented to the operator as a result of the operator using the client computer 104 to access the rules editing tool 412 (FIG. 4) provided by the authorization monitoring server 108. The client computer 104 may access the rules editing tool 412 via the browser 616 (FIG. 6) of the client computer 104.

The screen display of FIG. 12 includes a rule definition field 1202. The operator may enter text into the rule definition field and/or the operator may append items to the rule statement from the category tree shown at 1204. The entered text may include logical connectors such as the "And" connector 1206 shown in FIG. 12. In the particular example shown in FIG. 12, the operator has defined a rule which forbids employees located in a particular office (New York) from concurrently having certain levels of access to a trading application and a payment application. By actuating a button such as the "View Rules Results" button 1208, the operator may invoke the rules evaluation engine 416 (FIG. 4) to cause the rules evaluation engine 416 to analyze the data in the user access repository 408 to determine whether there are user access assignments in the computer system 100 that violate the rule defined in the rule definition field 1202. The analysis of the data in the user access repository 408 by the rules evaluation engine 416 is indicated in FIG. 9 at 904.

In the particular example illustrated in FIG. 12, the rule forbids a certain combination of location and access levels to two applications. Another type of rule may forbid a certain combination of department membership and access to an application. In another example, the defined rule may forbid a certain combination of department membership and a particular access level within an application. In still another example, the defined rule may forbid a certain combination of access authorizations to various applications. For example, the rule may forbid users from having access to both a first application and a second application. The latter type of rule may be particularly helpful in preventing violation of regulatory policies in a financial services firm such as an investment bank. For example, regulatory policies may not allow persons with access to certain confidential securities analysis reports from participating in securities trading activities of the financial services firm. For that purpose, the firm may, by utilizing an authorization monitoring server as described herein, implement a rule that forbids users who have access to a securities analysis reports application program from also having access to a securities trading application program.

In yet another example, the defined rule may forbid a certain combination of employee location and access to an application.

Rather than specifying particular applications, a rule may specify a group of applications. Rather than specifying a particular department, a rule may specify a group of departments. Rather than specifying a particular office location, a rule may specify a region of operation.

Those who are skilled in the art will appreciate that other and/or more complex rules may be defined in addition to or instead of the examples listed above.

Based on analysis of the data in the user access repository 408, the rules evaluation engine 416 determines (as indicated at 906 in FIG. 9) whether any user access assignments violate the rule defined by the operator. If so, then the violations are reported by the rules evaluation engine 416, as indicated at 908. FIG. 13 shows a screen display that is an example of how the rules evaluation engine 416 may report rule violations detected at 904-906. A field 1302 in the screen display shows the rule applied by the rules evaluation engine 416. A list of the detected violations of the rule appears at 1304. The violations report shown in FIG. 13 may, for example, be returned to the operator who defined and initiated application of the rule, and/or may be transmitted to one or more "owners" of the applications for which violations of the rule were found. As indicated at 910 in FIG. 9, the application "owner" or another authorized individual (including possibly the operator who defined the rule) may determine what should be done about the rule violations. This determination may be made on a violation-by-violation basis. If it is determined at 910 that a particular violation should be corrected, the authorized individual may cause the authorization monitoring server 108 to send, to a system administrator, an instruction (912 in FIG. 9) to revoke the user access assignment which is in violation of the rule. As a result, the system administrator may change the access control list for the application in question to revoke the offending user access assignment (914 in FIG. 9). Thereafter (either immediately or in due course), the application will send updated user access assignment data to the authorization monitoring server 108, which via the process of FIG. 7 will update (916 in FIG. 9) the user access repository 408 (FIG. 4) to reflect the correction of the rule violation.

Alternatively, if at 910 it is determined that the violation should be overridden, an instruction to that effect may be provided to the system administrator at 918 in FIG. 9. Data reflecting the override may be stored in the user access repository 408.

In the example process illustrated in FIG. 9, a rule that has just been defined by an operator is immediately applied by the rules evaluation engine 416 to the user access assignment data in the user access repository 408. In addition or alternatively, a rule defined with the rules editing tool 412 may be stored in the rules repository 414 (FIG. 4) either before or after the rule has been applied by the rules evaluation engine 416. A rule that has been stored in the rules repository 414 (FIG. 4) may be called up by an operator, and the operator may cause the rules evaluation engine 416 to analyze the user assignment data stored in the user access repository 408 on the basis of the rule that he/she has called up from the rules repository.

The potentially system-wide user access assignment record-keeping provided by the authorization monitoring server 108, coupled with rule-based analysis of the user access assignment data centralized in the authorization monitoring server 108, may allow administrative personnel to reliably enforce regulatory, administrative and/or best practices policies relating to access to the computer system, notwithstanding the essentially de-centralized nature of user access assignments via application program access control lists.

In some embodiments, instead of sending notices of rule violations to administrators for correction by the administrators, the authorization monitoring server 108 may, at least in some cases, interact directly with the servers 102 on which the applications run to directly and automatically change the access control lists for the applications to abate rule violations.

The authorization monitoring server 108 may have archiving capabilities, and may follow archiving protocols, so as to support full audits after the fact of user access assignments and the management of user access assignments. By supporting such audits, the authorization monitoring server 108 may aid the organization which operates the computer system 100 in demonstrating compliance with regulatory policies or other policies related to user access assignment practices.

Figure 10:
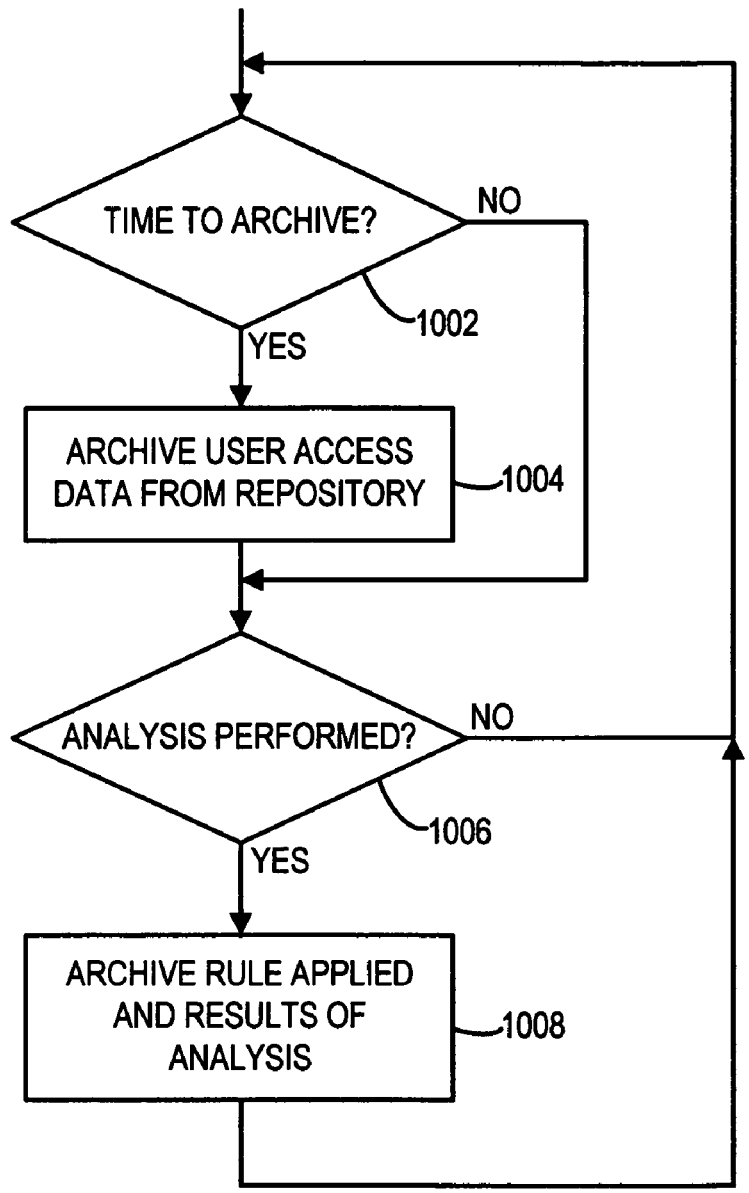
FIG. 10 is a flow diagram that illustrates an exemplary process for generating an audit trail in regard to assignments of access to application programs that run in the system of FIG. 1.

FIG. 10 is a flow diagram that illustrates an exemplary process for generating an audit trail in regard to assignments of access to application programs that run in the computer system 100.

At 1002 in FIG. 10, it is determined whether the current time matches a pre-determined point in time at which an archiving operation is to be performed. In some embodiments, the archiving operation is to be performed at regular intervals, such as daily, weekly, monthly, quarterly or annually. If a positive determination is made at 1002 (i.e., if it is now time to perform an archiving operation), then an archiving operation is performed, as indicated at 1004. In the archiving operation, some or all of the user access assignment data and/or the user information stored in the user access repository 408 is copied onto one or more permanent removable data recording media such as magnetic tape cassettes, CD-ROMs, DVDs, "zip" disks or the like. Alternatively, the data from the user access repository data may be transferred to an inactive portion of a non-removable storage medium such as a hard disk drive. In contrast to a conventional data back-up operation, the media used for archiving are not overwritten at regular short intervals, but rather may be preserved with the archived data intact for an extended period of time.

At 1006 in FIG. 10, it is determined whether the rules evaluation engine 416 has been caused to analyze the user access assignment data in the user access repository 408. If so, an archive operation (indicated at 1008) is performed. In the archive operation of block 1008, the rule applied in the analysis detected at 1006 is permanently stored, together with the results of the analysis (i.e., the violations of the rule detected by the analysis).

By the archiving operations of blocks 1004, 1008, a permanent and auditable record may be kept that includes both "snapshots" of system-wide user access assignments plus efforts that have been undertaken to enforce policies related to user access assignments. The archived data from a number of "snapshot" archive operations (e.g., ten or more archive operations) plus all of the analysis results over a period of time may be printed out and/or transferred to another storage medium (e.g., a hard disk drive on the auditor's computer) to aid in auditing compliance with user access assignment policies.

The authorization monitoring server 108 may also be operable to allow for improved management of user access assignments on an application by application basis. For example, the authorization monitoring server 108 may provide functionality that allows an application "owner" or the "owner's" delegate to perform a certification process with respect to the user access assignments for the application to assure that all current assignments meet with the "owner's" intentions.

Figure 11:
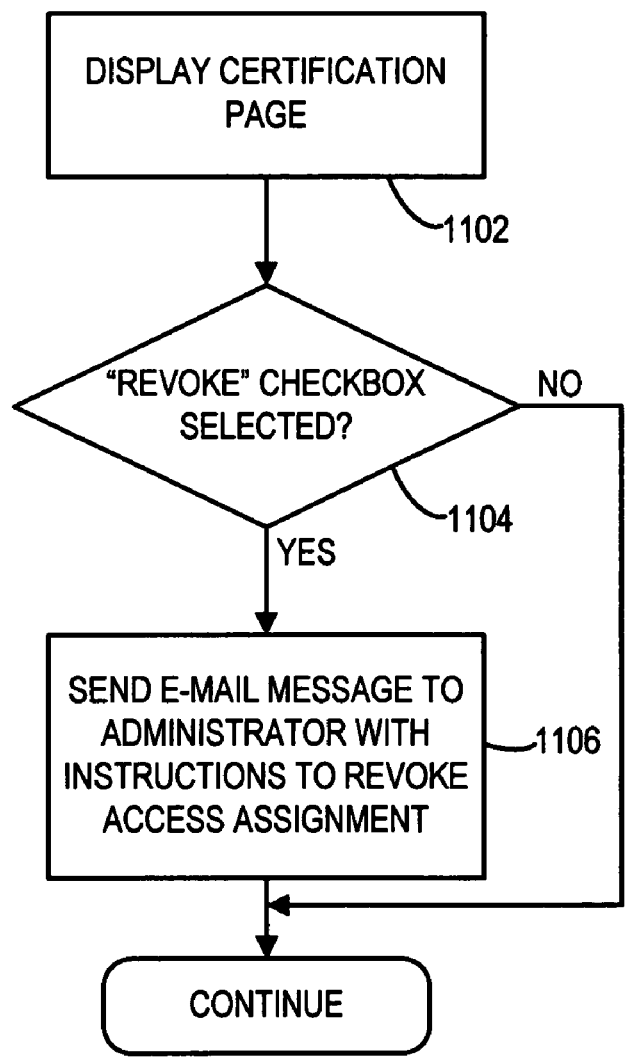
FIG. 11 is a flow diagram that illustrates an exemplary process for performing some aspects of a process in regard to certification of proper access assignment practices with respect to one of the application programs that run in the system of FIG. 1.

FIG. 11 is a flow diagram that illustrates an exemplary process for performing some aspects of a certification process in regard to certification of proper access assignment practices with respect to one of the application programs that run in the computer system 100. In some embodiments, certification of user access assignments for an application may be performed on a regular basis, such as quarterly. In other embodiments, certification of user access assignments for an application may be performed on demand or ad-hoc.

At 1102 in FIG. 11, a screen display for operating the certification function is displayed. FIG. 14 shows an example of such a screen display. It will be observed that the screen display of FIG. 14 includes a number of entries 1402, each of which represents a respective user access assignment with respect to the application being certified from the point of view of user access. Each entry may, for example, include data that identifies the office location and departmental affiliation of the corresponding user. Each entry may also include a display element such as a checkbox 1404. The checkbox 1404 may be actuated (via a cursor and mouse, which are not shown) to indicate that the corresponding user access assignment is being revoked. In some embodiments, the screen display of FIG. 14 may be scrollable and may reflect sorting of users by department and/or location.

In addition or as an alternative to features described above, a screen display like that shown in FIG. 14 may also include (a) a display element such as a checkbox to indicate that a user access assignment is to be allowed, and/or (b) a display element such as a checkbox to indicate that a user access rule that forbids a certain user access assignment is to be overridden with respect to that assignment. In the latter case, a further checkbox or checkboxes may be used to indicate that the override is either permanent or temporary.

Referring again to FIG. 11, it is determined at 1104 whether the checkbox to indicate revocation is actuated. (In some embodiments, the "deny access" checkbox may be omitted and/or the "allow access" checkbox may be "unchecked" to indicate revocation of the corresponding user access assignment.)

If a positive determination is made at 1104 (i.e., if the indication is provided to revoke a user access assignment) then block 1106 follows. At block 1106, the authorization monitoring server 108 may send an e-mail message to a system administrator instructing the system administrator to revoke the user access assignment in question. This may be done, for example, by the system administrator removing the particular user from the access control list for the application that is being certified.

All actions described herein as being performed by a human operator, system administrator or a user or other individual may, in at least some cases, be accomplished by the individual operating one of the client computers 104 such that the client computer interacts with the authorization monitoring server 108 or one of the servers 102 via the browser program of the client computer. Any screen display described or referred to herein may be displayed on the display component of a client computer 102 and may be generated by the browser programs of the client computer in response to interaction with the authorization monitoring server or another server of the computer system 100.

In some embodiments, the data stored in the user access repository may not reflect all applications that run in the computer system nor all access control lists of such applications. Nonetheless, it will be recognized that there may be a plurality of application programs installed in the computer system for which all user access assignment data is stored in the user access repository, notwithstanding the presence in the computer system of other applications and/or other access control lists which are not represented in the user access repository.

As noted before, some embodiments allow an access rule violation to be temporarily overridden. In such embodiments, the system may automatically track and detect expiration of temporary overrides and may automatically generate a notice concerning a rule violation that arises as a result of the expiration of a temporary override.

In some embodiments, a change in user attributes (such as a transfer to another department or location) may be proposed and the user access repository may be analyzed with a user access rule to determine whether a violation of the rule would result from the proposed change in attribute. Also, or alternatively, a new user access assignment may be proposed (without actually changing an application's access control list), and the user access repository may be analyzed with a user access rule to determine whether the proposed new user access assignment would result in a violation of the user access rule.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of operating a computer system, the method comprising:
    installing a plurality of application software programs in a plurality of server computers in said computer system;
    defining user access assignments in said server computers for each of said application software programs for a respective plurality of users;
    loading user access assignment data from each of said plurality of servers to an authorization monitoring server computer in said computer system;
    storing, in a user access repository in said authorization monitoring server computer, said loaded user access assignment data, said loaded user access assignment data representing all of said user access assignments;
    defining a user access rule, said user access rule forbidding at least one user access assignment or at least one combination of user access assignments; and
    analyzing said user access assignment data stored in said user access repository to determine whether said user access rule is violated by said user access assignments.

2. The method of claim 1, further comprising:
    generating a report to indicate each user access assignment that violates said user access rule.

3. The method of claim 2, further comprising:
    displaying said report on a display device of said computer system.

4. The method of claim 2, further comprising:
printing said report.

5. The method of claim 1, further comprising:
automatically deleting and/or disabling each of said user access assignments that violates said user access rule.

6. The method of claim 1, wherein said user access rule forbids any of said users to have access both to a first one of said applications and to a second one of said applications.

7. The method of claim 1, wherein said user access rule forbids any of said users who is a member of a certain department to have access to a certain one of said applications.

8. The method of claim 1, wherein said user access rule forbids any of said users who is located in a certain office to have access to a certain one of said applications.

9. The method of claim 1, wherein said user access assignment data includes, with respect to at least one of said application software programs, data that indicates respective levels of access granted to users assigned access to said at least one application software program.

10. The method of claim 9, wherein said user access rule forbids any of said users having a certain level of access to a first one of said applications to have access to a second one of said applications.

11. The method of claim 9, wherein said user access rule forbids any of said users having a certain level of access to a first one of said applications to have a certain level of access to a second one of said applications.

12. The method of claim 1, wherein defining said rule includes entering logical connectors together with user and/or application attributes into a screen display.

13. The method of claim 1, wherein said application software programs include at least twenty application software programs.

14. The method of claim 13, wherein said application software programs include at least one hundred application software programs.

15. The method of claim 1, wherein defining user access assignments includes generating access control lists for said application software programs.

16. The method of claim 1, further comprising:
proposing a change in an attribute of a user; and
analyzing said user access assignment data to determine whether said user access rule is violated by the proposed change.

17. The method of claim 1, further comprising:
proposing a new user access assignment; and
analyzing said user access assignment data to determine whether said user access rule is violated by the proposed new user access assignment.

18. The method of claim 1, further comprising:
allowing an administrator to override said rule with respect to a particular user access assignment.

19. A method of operating a computer system, the method comprising:
installing a plurality of application software programs in a plurality of server computers in said computer system;
defining user access assignments in said server computers for each of said application software programs for a respective plurality of users;
loading user access assignment data from each of said plurality of servers to an authorization monitoring server computer in said computer system;
storing, in a user access repository in said authorization monitoring server computer, said loaded user access assignment data, said loaded user access assignment data representing all of said user access assignments; and
archiving said user access assignment data stored in said user access repository on each of a plurality of occasions.

20. The method of claim 19, wherein said plurality of occasions includes three occasions.

21. The method of claim 20, wherein said plurality of occasions includes ten occasions.

22. The method of claim 21, further comprising:
simultaneously holding in a storage device said archived user access assignment data for all of said plurality of occasions.

23. The method of claim 21, further comprising:
on an occasion later than said plurality of occasions, printing a report of all of said user access assignment data archived on all of said plurality of occasions.

24. The method of claim 19, further comprising:
defining a user access rule, said user access rule forbidding at least one user access assignment or at least one combination of user access assignments;
analyzing said user access assignment data in said user access repository to determine whether said user access rule is violated by said user access assignments; and
archiving said rule and results of said analyzing step.

25. The method of claim 19, wherein defining user access assignments includes generating access control lists for said application software programs.

26. The method of claim 19, further comprising:
auditing said archived data.

27. A method of operating a computer system, the method comprising:
installing a plurality of application software programs in a plurality of server computers in said computer system;
defining user access assignments in said server computers for each of said application software programs for a respective plurality of users;
loading user access assignment data from each of said plurality of servers to an authorization monitoring server computer in said computer system;
storing, in a user access repository in said authorization monitoring server computer, said loaded user access assignment data, said loaded user access assignment data representing all of said user access assignments;
displaying in a screen display some of said data, said screen display including a display element to indicate that one of said user access assignments is to be revoked;
detecting actuation of said display element; and
responding to said detected actuation of said display element by sending an electronic mail message to a system administrator or another computer system to indicate that said one of said user access assignments is to be revoked.

28. The method of claim 27, wherein said screen display also includes data to identify a department and a location of a user who corresponds to said one of said user access assignments.

29. The method of claim 27, wherein said display element is a check-box.

30. The method of claim 27, further comprising:
displaying in said screen display at least one of:
a display element to indicate that one of said user access assignments is to be allowed; and
a display element to indicate that a forbidden user access assignment is to be allowed by temporarily overriding revocation of user access.

31. The method of claim 27, further comprising:
archiving said user access assignment data.

32. The method of claim 27, wherein all user access assignments indicated on said display are for users in a single department and/or location.

33. The method of claim 27, wherein an operator is allowed to override a user access assignment rule.

34. The method of claim 33, wherein said operator is allowed to indicate whether said override is temporary or permanent.

35. The method of claim 34, further comprising:
detecting expiration of a temporary rule override; and
providing an indication of a rule violation resulting from said expiration.

* * * * *